July 19, 1949.  R. S. SANFORD  2,476,948
CONTAINER

Filed Feb. 3, 1945  8 Sheets-Sheet 1

Inventor:
Roy S. Sanford.
By Thiess, Olsen & Mecklenburger
Attys.

July 19, 1949.   R. S. SANFORD   2,476,948
CONTAINER
Filed Feb. 3, 1945   8 Sheets-Sheet 2

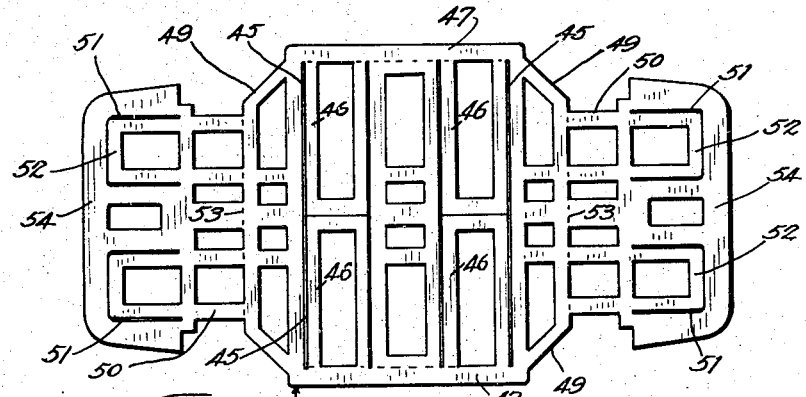
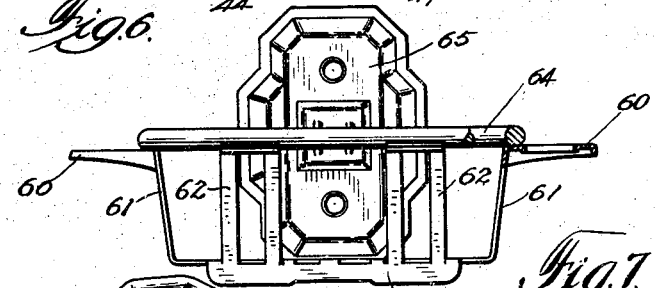
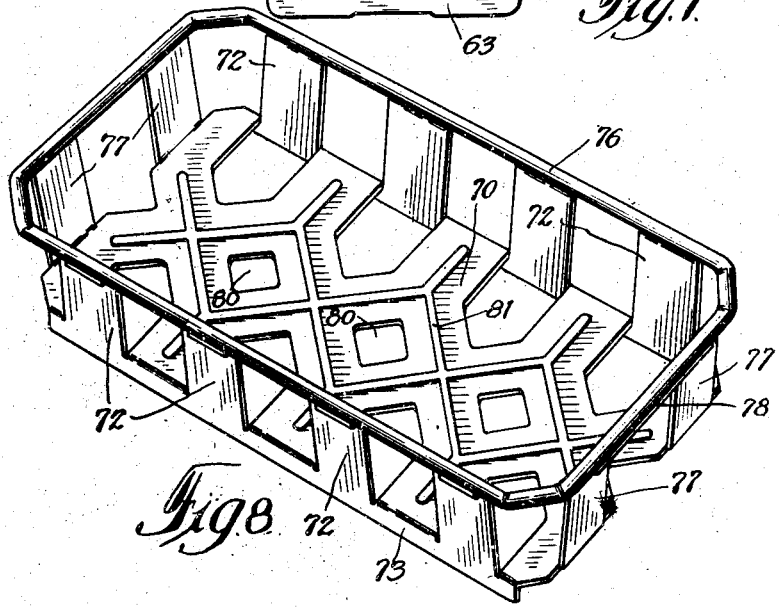

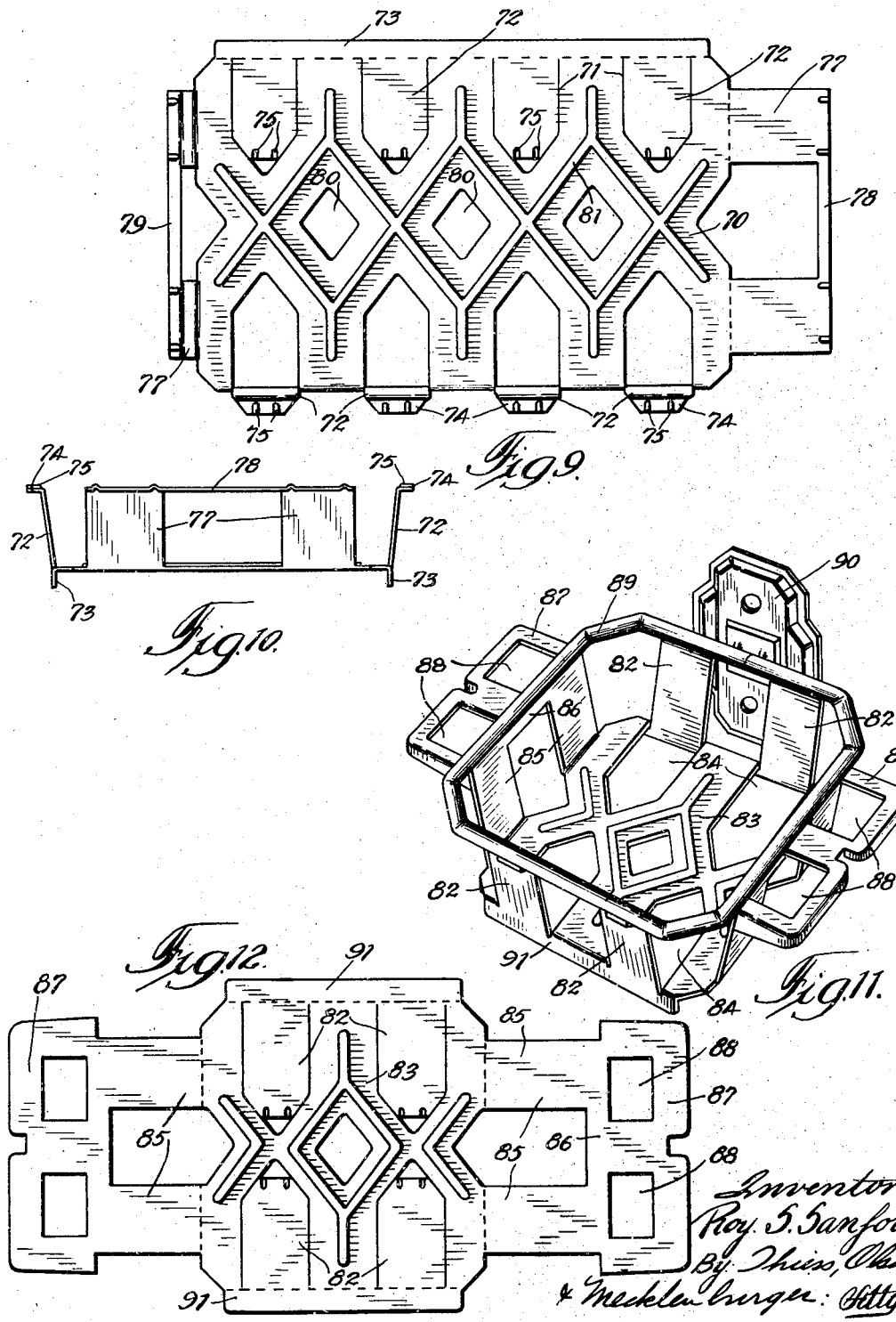

July 19, 1949. R. S. SANFORD 2,476,948
CONTAINER
Filed Feb. 3, 1945 8 Sheets-Sheet 5

Inventor:
Roy S. Sanford.
By Thiess, Olson & Mecklenburger
Attys.

July 19, 1949.　　　R. S. SANFORD　　　2,476,948
CONTAINER
Filed Feb. 3, 1945　　　　　　　　　　　　8 Sheets-Sheet 6

Inventor:
Roy S. Sanford
By Thiess, Olson & Mecklenburger
Attys.

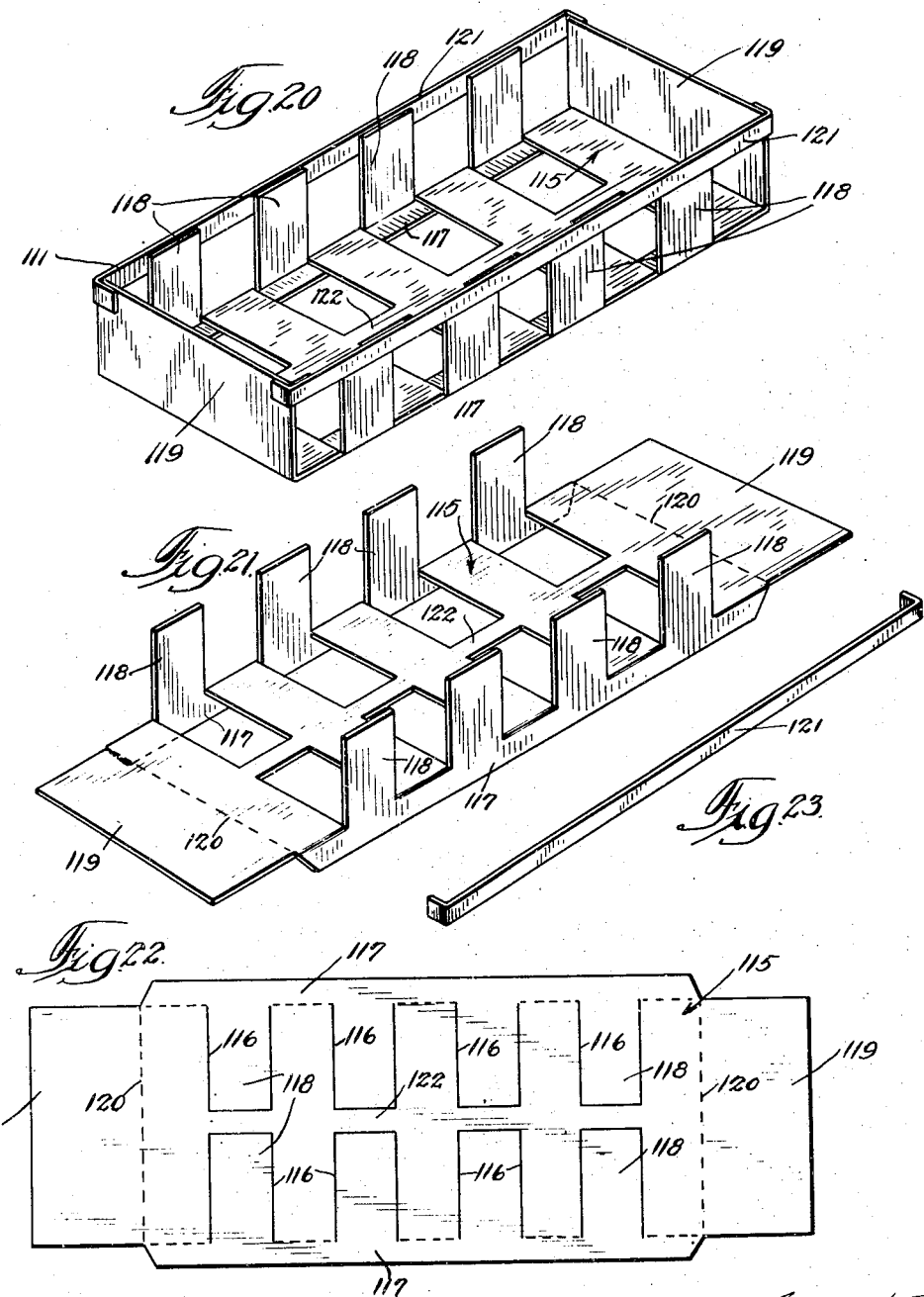

July 19, 1949.　　　　　R. S. SANFORD　　　　　2,476,948
CONTAINER

Filed Feb. 3, 1945　　　　　　　　　　　　　　8 Sheets-Sheet 8

Inventor:
Roy S. Sanford.
By Thiess, Olsen & Mecklenburger
Attys.

Patented July 19, 1949

2,476,948

UNITED STATES PATENT OFFICE 2,476,948

CONTAINER

Roy S. Sanford, Woodbury, Conn., assignor to Autoyre Company, Incorporated, Oakville, Conn., a corporation of Connecticut Application February 3, 1945, Serial No. 576,071

22 Claims. (Cl. 211—73)

This invention relates to containers, more particularly to containers made from sheet material and having one or more apertured or perforated walls, and the invention has for an object the provision of improved containers of this character and improved methods of manufacturing such containers.

Although the invention is applicable to containers of various types including cartons, trays or boxes made from paper board or the like, as hereinafter appears, it particularly relates to the manufacture of open topped sheet metal containers such as soap dishes, combined tumbler and toothbrush holders and the like. Such sheet metal containers have heretofore been fabricated either by securing together a plurality of suitably formed wire loops or strips to provide an attractive light and durable basket, tray or container, or by suitably stamping a flat sheet of metal to provide an apertured or perforated central portion constituting the bottom wall of the container and having side wall-forming portions extending outwardly from the edges thereof, and then folding these extending portions upwardly to form the sides of the container. The blank in this latter type of construction must be at least as wide as the combined width of the bottom and the height of the two longitudinal side walls, and must be at least as long as the combined length of the bottom wall and the height of the transverse side walls.

The recent substantial increases in both labor and material costs will inevitably be reflected in the final costs and sales prices of the finished articles if the above-referred-to types of containers are manufactured in the known fashion after termination of the present emergency. It is highly desirable, however, that containers of this character be manufactured at costs which will permit them to be sold at prices comparable to previous levels in spite of the increase in labor costs and material costs. The number of bending, welding and similar operations necessary in manufacturing the above-referred-to wire type of containers involves high labor costs, and the amount of sheet material required in manufacturing the above-referred-to stamped type of containers results in relatively high material costs. Accordingly, it is a further object of this invention to provide an improved method of manufacturing containers of this type which results in low cost, attractive and durable articles, and which may be carried out with an expenditure of minimum amounts of material and labor.

In carrying out the invention in one form, a suitable sheet of material is slit to form a plurality of tongues having free inner ends, the slits terminating short of the edges of the sheet to leave unslit marginal portions. The tongues are then bent upwardly and outwardly to form spaced side members along the edges of the sheet, which side members are connected to intermediate portions of the sheet solely by the unslit marginal portions, and the upper ends of the side members are then connected to an edge-forming strip or strips to complete the side walls of the container. The container thus formed has apertures or perforations in the bottom wall corresponding to the tongues which have been bent upwardly, and both the bottom wall and the side wall-forming tongues may be additionally slit, stamped or perforated to provide a desired ornamental design. The tongues may be spaced along two or more edges, or at the corners of the sheet, as desired, and if arranged along only two longitudinal edges, extensions of the sheet are provided which are adapted to be bent upwardly and inwardly to form the transverse side walls.

In certain embodiments of the invention the marginal portions are bent downwardly into substantially the plane of the upwardly bent tongues or side members so as to form decorative and reinforcing edge runners extending below the plane of the bottom wall of the container. In other embodiments, particularly containers or cartons made from paper board, the edge portions may be bent upwardly into face-to-face contact with the tongues or side members and adhesively secured thereto, or may be bent inwardly into face-to-face engagement with and adhesively secured to the undersurface of the bottom wall of the container.

For a more complete understanding of the invention, reference should now be had to the drawings in which:

Fig. 6 is a plan view of a blank from which the bottom wall, side walls and brush-holding loops of the article shown in Fig. 5 may be formed;

Fig. 7 is a front view partially in section of another form of combined tumbler and toothbrush holder embodying the present invention;

Fig. 8 is a perspective view of a second form of soap dish embodying the present invention;

Fig. 9 is a plan view of a partially formed blank from which the bottom and side walls of the soap dish shown in Fig. 8 may be formed;

Fig. 10 is an end elevational view of the soap dish shown in Fig. 8 before the upper edge-forming strip or ring is secured thereto;

Fig. 11 is a perspective view of another form of combined tumbler and toothbrush holder embodying the present invention;

Fig. 12 is a plan view of a blank employed in forming the combined tumbler and toothbrush holder of Fig. 11;

Fig. 20 is an isometric view of a carton or box embodying the present invention;

Fig. 21 is a similar view of a partially formed blank from which the bottom and side walls of the carton shown in Fig. 20 may be formed;

Fig. 22 is a plan view of the slit but unfolded blank shown in Fig. 21;

Fig. 23 is a detail view of one of the edge-forming strips employed in the carton of Fig. 20;

Figure 1:
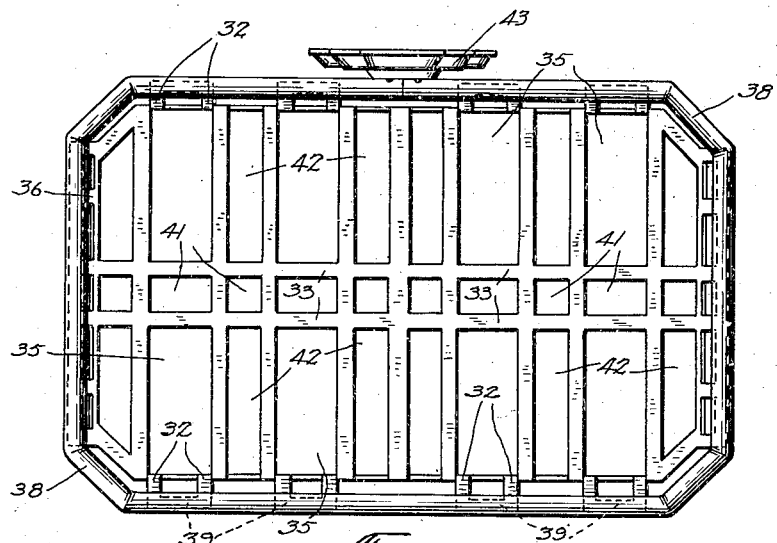
Fig. 1 is a top plan view of a soap dish embodying the present invention.
Figure 2:
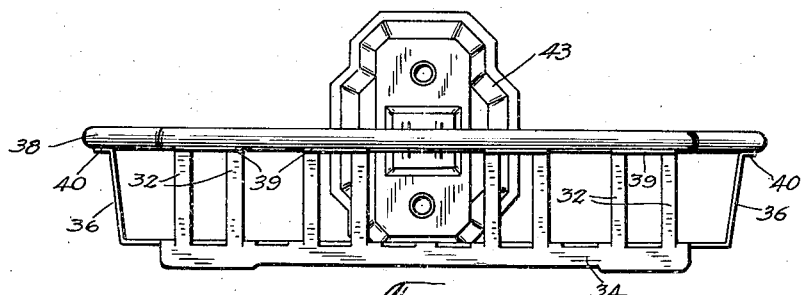
Fig. 2 is a front elevational view of the soap dish shown in Fig. 1.
Figure 3:
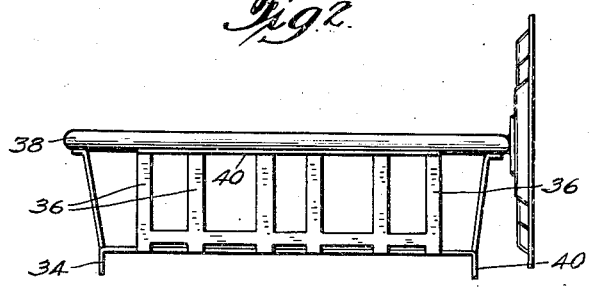
Fig. 3 is a side elevational view of the soap dish shown in Fig. 1.
Figure 4:
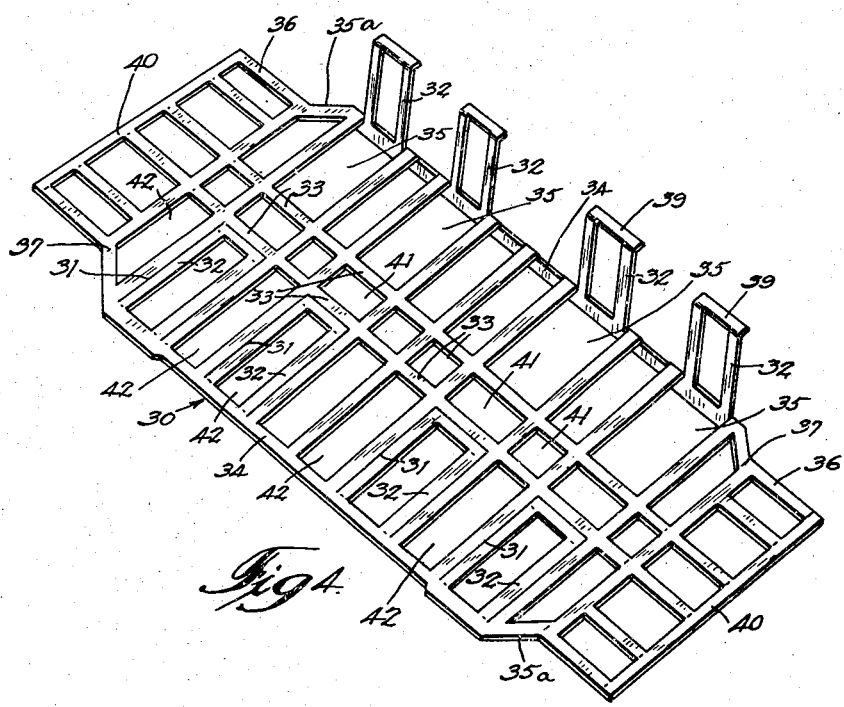
Fig. 4 is a perspective view of a partially formed blank or sheet illustrating the manner in which the soap dish of Figs. 1 to 3 may be constructed.

Referring now to the drawings, the invention is shown in Figs. 1 to 4 as embodied in a soap dish which is designed to resemble the previously referred to wire type soap dishes. As shown best in Fig. 4, a blank or sheet 30, which is preferably formed of metal of suitable thickness, is provided along the two opposite longitudinal edges thereof with a plurality of substantially U-shaped slits 31 so as to form tongues 32, the opposed free inner ends of which are spaced to leave a longitudinally extending central portion 33. The U-shaped slits 31 terminate short of the edges of the blank 30 to leave unslit marginal edge portions 34 which serve to connect the tongues 32 together and to the intervening portions of the blank or sheet. In the formation of the dish the tongues 32 are bent upwardly and outwardly to form spaced-apart side members for the soap dish, and, as shown best in Fig. 4, one of the side members 32 is disposed at the outer end of each of the apertures 35 formed in the sheet by bending the tongues 32 outwardly. In Fig. 4 one row of tongues is shown before bending out of the plane of the sheet and the other row of tongues is shown bent upwardly to the position in which they form side members for the soap dish. Preferably the marginal portions 34 are bent downwardly out of the plane of the sheet so as to form continuous runners or lower edge members which serve to reinforce the structure and provide a finished ornamental appearance. The edgewise disposed runners 34 are helpful in preventing bending or deformation of the soap dish due to accidental blows during shipping or when displayed on a counter for sale, as well as when in actual use.

Adjacent the opposite transverse ends thereof the sheet 30 is tapered inwardly as indicated by the reference numeral 35a, and an outwardly extending portion 36 is provided for forming additional side walls of the soap dish. When the extending portions 36 are bent upwardly and inwardly substantially along the bending lines 37, these portions form the transverse sides of the soap dish. The upper edge of the soap dish comprises a ring-shaped strip or edge-forming member 38 (Figs. 1 to 3) which is preferably secured by spot welding to the upper ends of all of the side members or tongues 32 as well as the side members 36. As shown, each of the side members 32 has the upper end thereof bent outwardly to provide a flange 39 for engaging the undersurface of the ring 38 in order to provide a secure weld therebetween. Likewise, the other ends 40 of the side members 36 are bent outwardly to form flanges for similarly engaging the edge-forming ring 38.

In order to simulate the wire type soap dish, the centrally disposed portion 33 of the bottom wall of the soap dish is provided with a plurality of apertures 41 and additional apertures 42 are provided between the apertures 35 left by the tongues 32. Likewise, each of the tongues 32 and the side members 36 is apertured, as shown, so as to provide spaced-apart arms which resemble wire members.

When the soap dish is used as a movable article adapted to be placed on a table or washbowl, the runners 34 formed by the unslit marginal portions of the blank 30 serve as supporting legs for the dish, and when it is desired to secure the soap dish to a wall or similar support in predetermined rigid relation, a suitable bracket 43 may be welded or similarly secured to the dish, preferably by welding a portion of the ring 38 to the bracket as heretofore done in prior soap dishes.

Figure 5:
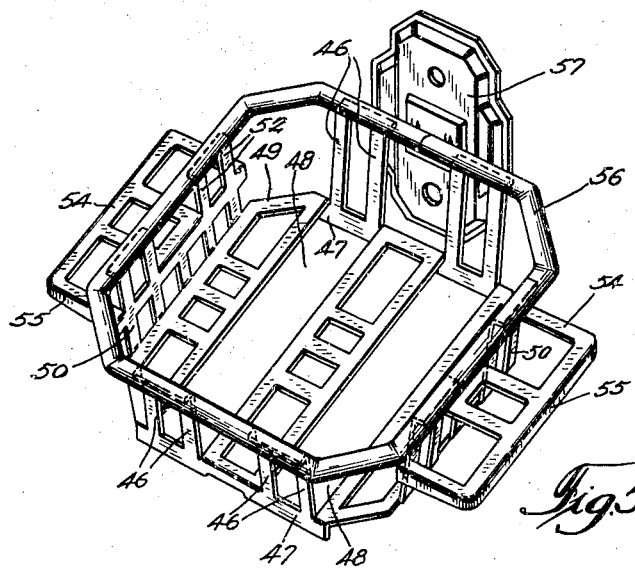
Fig. 5 is a perspective view of a combined tumbler and toothbrush holder embodying the present invention.

In Figs. 5 and 6 the invention is shown as embodied in a combined tumbler and toothbrush holder which is likewise designed to simulate prior wire type articles. In the formation of this article a sheet of suitable metal is stamped to form the blank 44 shown in Fig. 6, which is provided with U-shaped slits 45 along two opposed edges thereof to form tongues 46 which are integrally connected at their outer ends to unslit continuous marginal portions 47. It will be observed that in this embodiment the free inner ends of the tongues 46 are not spaced apart, and accordingly when the tongues are bent upwardly and outwardly to form spaced-apart side members, as shown in Fig. 5, apertures 48 are formed in the bottom wall of the tumbler holder which extend entirely across the bottom wall.

The ends of the portion of the blank 44 which forms the bottom wall of the tumbler holder are tapered, as indicated by the reference numerals 49, and extending outwardly from the opposed edges of this bottom-forming portion are additional portions 50 which are shaped to form not only additional side members for the tumbler holder, but also to form the brush-holding loops. Thus the extending portions 50 are provided with U-shaped slits 51 which define tongues 52 with the extending portions 50 and having free outer ends. When the portions 50 of the blank are bent upwardly substantially along the bending lines indicated by the reference numerals 53, the section 54 of each of the portions 50 which surrounds the tongues 52 may be bent outwardly and downwardly to the positions shown in Fig. 5 to form the brush-holding loops of the combined tumbler and toothbrush holder, the tongues 52 cooperating with the other portions of the extensions 50 to form side wall members of substantially the same height as the tongues 46. As shown, the portions 54, which form the brush-holding loops, may be formed to provide a peripheral downwardly extending flange 55 which serves to reinforce these loops and provide an attractive appearance. Secured to the upper ends of each of the side-forming tongues 46 and 52 is a ring-shaped edge-forming strip 56 to which a suitable supporting bracket 57 may be secured.

In Fig. 7 a combined tumbler and toothbrush holder is shown which is similar to the embodiment shown in Figs. 5 and 6, except that the brush-holding loops 60 extend outwardly from the upper ends of the side-forming members 61 instead of extending outwardly therefrom at an intermediate point as in Fig. 5. The side-forming members 61 take the place of the portion 50 and the tongues 52 in the embodiment of Fig. 5. The tongues 62 in the embodiment of Fig. 7 correspond to the tongues 46 of Fig. 5 and are carried by marginal edge portions or runners 63 corresponding to the runners 47 of Fig. 5. The upper edge of the tumbler-holding portion of the embodiment shown in Fig. 7 is formed by a ring-shaped strip 64 to which a supporting bracket 65 is connected. It is thought that the form of the blank necessary to produce the embodiment shown in Fig. 7 will be apparent without further illustration, and that the method of forming the combined tumbler and toothbrush holder of Fig. 7 will be apparent from the foregoing description of Figs. 1 to 6.

In Figs. 8, 9 and 10 the invention is shown as embodied in a soap dish having a bottom wall-forming portion 70 which, as shown best in Fig. 9, is provided with U-shaped slits 71 to form tongues 72, the outer ends of which terminate in an unslit marginal portion 73. The inner ends of the tongue 72 are tapered as shown, the tip of each tongue being cut off and bent outwardly to form flanges 74 as shown best on the tongues 72 spaced along the lower edge of the blank illustrated in Fig. 9 and as also shown in Fig. 10. The flanges 74 are preferably provided with spaced embossments 75 which assist in carrying out the spot welding operation employed in securing the upper edge-forming member or ring 76 (Fig. 8) thereto. Extending outwardly from the opposed ends of the bottom wall-forming portion 70 are a plurality of tongues or side-forming members 77 which are connected together at their outer ends by a strip 78 adapted to be folded outwardly to form a flange 79 for engaging the ring 76.

In forming the soap dish constituting this embodiment of the invention the blank is first slit and suitably stamped, the tongues 72 are thereupon bent upwardly and outwardly, the side-forming members 77 bent upwardly and inwardly, and the ring 76 secured to the flanges 74 and 79 on the upper ends of the side-forming members and tongues. Simultaneously with the bending of the tongues 72 into the desired upstanding position, the continuous marginal portion 73 may be bent downwardly to form the edge runners as shown in Figs. 8 and 10. The bottom wall 70 may be provided with suitable apertures 80 and is preferably embossed as shown in Fig. 8 to provide a pleasing appearance and add strength and rigidity to the bottom wall of the dish, the embossments being indicated by the reference numeral 81.

It will of course be understood that any suitable design commensurate with the formation of the apertures left by the tongues 72 may be provided in the bottom wall of the soap dish. Although no supporting bracket is shown in Figs. 8 to 10 of the drawings, it will of course be understood that this embodiment of the invention may include a supporting bracket suitably secured thereto as in the previously described embodiments of the invention.

In Figs. 11 and 12 there is shown a combined tumbler and toothbrush holder which follows the general design of the soap dish shown in Figs. 8, 9 and 10. Opposed side walls of the tumbler-holding portion of this embodiment of the invention are formed by the tongues 82 which are bent upwardly out of the plane of the bottom wall 83 so as to leave apertures 84 therein, and the other two side walls of the tumbler holder are formed by spaced-apart outwardly extending tongues 85 which are connected together at their outer ends by a cross strip 86. This cross strip 86 is integral with an apertured extension 87 (Fig. 12) which may be bent downwardly and suitably flanged to form the brush-holding loops 88 as shown in Fig. 11. The upper edge-forming member or ring 89 in this embodiment of the invention is secured to the upper ends of the tongues 82 and to the cross strip 86 on the upper ends of the tongues 85 and carries a suitable supporting bracket 90. As in the previously described embodiments of the invention, the tongues 82, which are formed from the bottom wall, terminate in and are carried by continuous marginal portions 91 which are turned downwardly to form continuous edge members or runners.

It will be observed that in all of the embodiments of the invention thus far described the blank from which the container or dish is formed is no wider than the finished container, and consequently by using part of the material from the bottom wall to form the side members, a substantial saving in material is accomplished. It will likewise be observed that this saving is accomplished without introducing into the manufacturing process or method any complicated and labor consuming operations.

Figure 13:
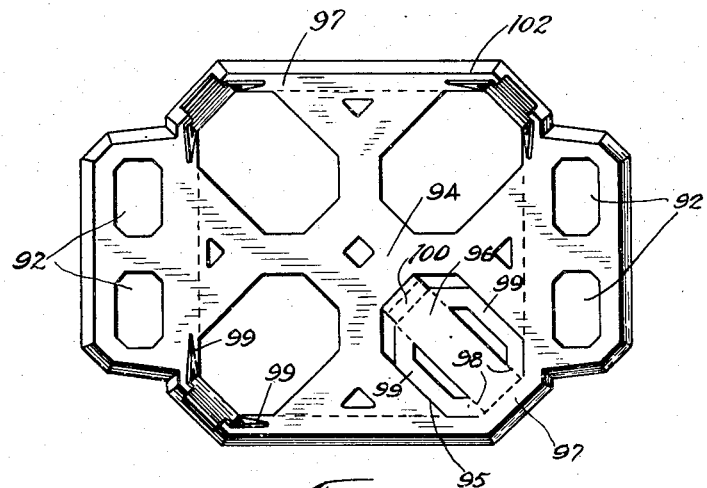
Fig. 13 is a top plan view of a partially formed blank from which another combined tumbler and toothbrush holder embodying the present invention may be formed.
Figure 14:
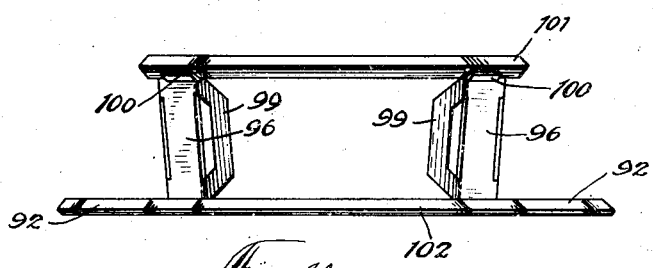
Fig. 14 is a front elevational view of a combined tumbler and toothbrush holder formed from the blank of Fig. 13.
Figure 15:
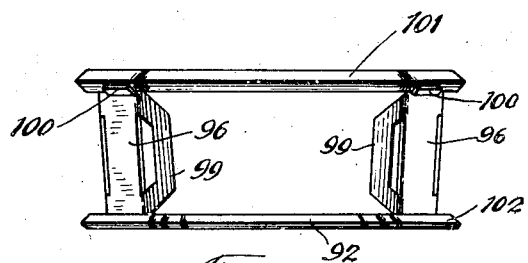
Fig. 15 is a side elevational view of the combined tumbler and toothbrush holder shown in Fig. 14.
Figure 16:
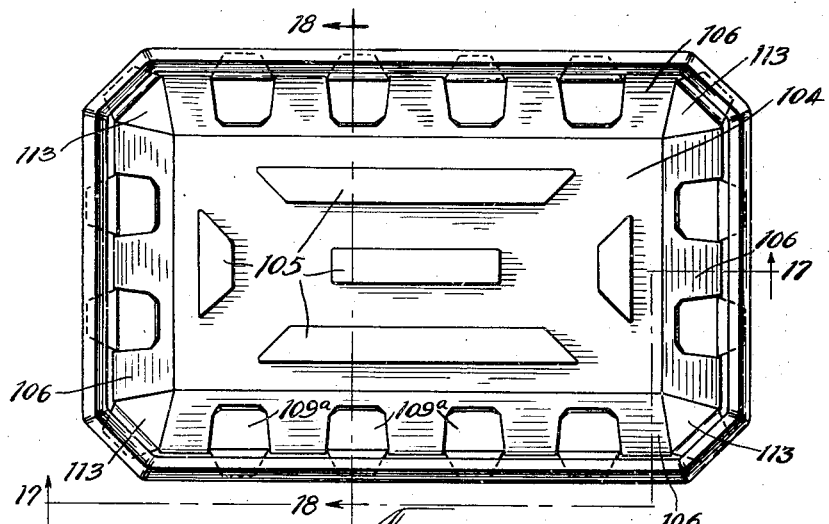
Fig. 16 is a top plan view of still another form of soap dish embodying the present invention.
Figure 17:
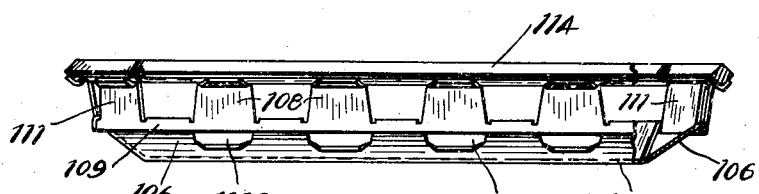
Fig. 17 is a front elevational view partly in section along the line 17—17 of Fig. 16.

In the embodiment of the invention shown in Figs. 13, 14 and 15, a combined tumbler and toothbrush holder is provided in which the brush-holding loops 92 are integral with and extend outwardly in the same plane as the bottom wall 94 of the tumbler-holding portion. This bottom wall 94 is provided with diagonally extending slits 95 at each corner thereof to form tongues 96, the free ends of which are disposed adjacent the center of the bottom wall, the outer end of each tongue being integral with a marginal edge portion 97. Each of the tongues 96 is bent outwardly and upwardly from the plane of the bottom wall 94, and the opposed edges of each tongue are bent along the lines 98 to extend obliquely from the center portion of the tongue so as to provide wings 99 lying in the respective side planes of the tumbler-holding portion. As shown in the lower right-hand corner of Fig. 13, each of the tongues 96 is provided at its free inner end with an extension which is adapted to be folded outwardly so as to form a flange 100 on the upper end of each tongue. These flanges are shaped, as shown best in Figs. 14 and 15, to receive the lower surfaces of a wire ring 101 which is substantially square in cross section and forms the upper edge of the tumbler-holding portion. As shown, the outer marginal portions of the blank from which the tumbler and toothbrush holder is formed may be suitably flanged throughout the entire periphery so as to provide a decorative flange 102 extending about both the tumbler-holder portion and the brush-holding loops. In this embodiment of the invention the blank from which the tumbler and toothbrush holder is formed is not substantially greater in dimensions than the finished article, and consequently a great saving in material is accomplished.

Figure 18:
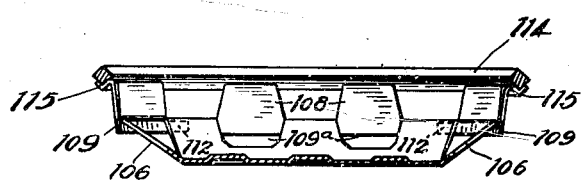
Fig. 18 is a sectional view taken substantially along the line 18—18 of Fig. 16.
Figure 19:
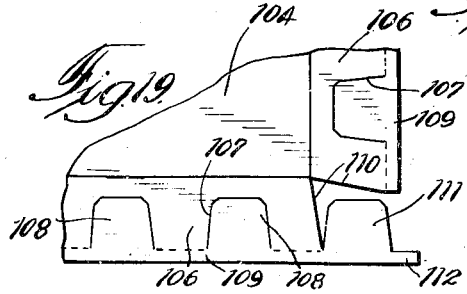
Fig. 19 is a fragmentary view of one corner of a blank from which the soap dish of Fig. 17 may be formed.

In the embodiment of the invention shown in Figs. 16 to 19, inclusive, a soap dish is provided having a bottom wall which is apertured only about the marginal portions thereof. Thus the soap dish includes a bottom wall having a solid central portion 104 which is provided with suitable embossments 105 for strengthening and decorative purposes, and, as shown, the peripheral portions 106 of the bottom wall extend upwardly at an angle with respect to the central portion 104. Each of the peripheral portions 106, as shown best in Fig. 19, is provided with a row of U-shaped slits 107 which define tongues 108 adapted to be bent upwardly and outwardly therefrom to form spaced-apart side members, the tongues being connected together by unslit marginal edge portions 109. When the tongues 108 are bent upwardly to form the side wall portions, apertures 109a are formed in the angularly extending peripheral portions 106 of the bottom wall of the soap dish. In order to properly form the dish at the four corners thereof, the peripheral portions 106 are cut away angularly along the lines 110 (Fig. 19) and one of the portions 106 at each corner of the blank is provided with an additional tongue 111 which is integral with an extension 112 of the unslit marginal portions 109.

When the portions 106 of the bottom wall are bent upwardly to the proper angle, the tongue 111 may be bent upwardly therefrom simultaneously with the bending of the tongues 108 and the extension 112 of the marginal strip 109 may then be lapped around the adjacent marginal strip and secured thereto as shown in Fig. 18. Thus the triangular aperture 113 (Fig. 16) is formed at each corner of the soap dish and the tongues 111 extend upwardly from the outer edges of these triangular apertures. The upper edge of the soap dish, as in the previously described embodiments of the invention, comprises a wire ring 114 which is secured to the outstanding flanges which are formed on the upper edges of all of the tongues 108 and to similar flanges formed on the upper ends of the tongues 111. In this embodiment of the invention it will be observed that all of the sides of the soap dish are formed from the material of the bottom wall, and that consequently the blank or sheet of metal necessary for forming this soap dish is not materially greater in dimensions than the finished article.

In Figs. 20 to 23, inclusive, the invention is shown as embodied in a box or carton for shipping or display purposes. Although this box or carton may likewise be made from sheet metal if desired, it is preferably formed from paper board or similar inexpensive material ordinarily used in the construction of cartons and containers. As shown in Fig. 22, the blank 115 from which the carton or container is formed is provided along opposed longitudinal edges thereof with U-shaped slits 116 which terminate short of the opposed edges to leave unslit marginal portions 117. The tongues 118 formed by the slits 116 may, as shown best in Fig. 21, be bent upwardly out of the plane of the blank to form upstanding side wall portions, the unslit marginal portions 117 being simultaneously bent downwardly out of the plane of the blank. Extending outwardly from the central portion of the blank 115 in which the tongues 118 are formed is a pair of side wall-forming members 119 which may be bent upwardly along the fold lines 120. In order to complete the carton a pair of edge-forming strips 121 (Fig. 23) is provided which may be adhesively secured to the upper ends of the side members or tongues 118, the opposite ends of the strips 121 being turned inwardly for securement to the end side wall members 119. The downwardly extending marginal portions 117, shown in Fig. 21, are bent inwardly and secured, preferably by adhesive, to the undersurfaces of the portions of the blank 115 which form the perforate bottom wall of the container or carton, as shown in Fig. 20. In this embodiment of the invention the free ends of the tongues 118 are spaced apart when formed so as to leave a central longitudinally extending portion 122 which extends throughout the length of the bottom wall of the container. It will of course be understood that any suitable top or closure member may be provided for cooperation with the finished container shown in Fig. 20, and the top or closure member may be secured to the body of the container in any desired manner.

Figure 24:
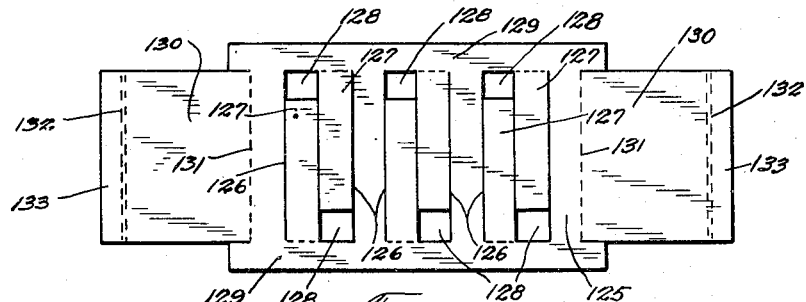
Fig. 24 is a plan view of a blank from which the bottom and side walls of another form of carton embodying the present invention may be formed.
Figure 25:
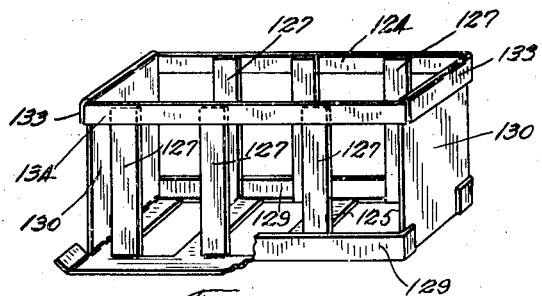
Fig. 25 is a perspective view of a carton formed from the blank of Fig. 24.

In the embodiment of the invention shown in Figs. 24 and 25, the central portion of a suitable blank 125 is again provided with rows of U-shaped slits 126, the slits in this case overlapping and having a portion of one leg of each slit coinciding with the adjacent slit to provide pairs of side-by-side tongues 127. In the embodiment shown the free end of each tongue terminates short of the base of the adjacent tongue so that a space 128 is left adjacent the free end of each tongue. If it is desired to form higher side walls on the container, however, the tongues may extend entirely to the base of the adjacent tongue so that the height of the side walls formed by the tongues will be the same as the width of the bottom wall of the container. In this embodiment of the invention the tongues are bent upwardly from the plane of the blank, as in the previously described embodiments, to form spaced-apart members, but the unslit marginal portions 129, which extend along the opposed longitudinal edges of the blank, are not bent downwardly but instead are bent upwardly into face-to-face engagement with the side members 127, as shown best in Fig. 25.

Adjacent the opposite ends thereof the blank 125 includes extending side wall-forming portions 130 which may be bent upwardly about the fold lines 131 to form the end walls of the carton or container. These portions 130 are preferably of greater height than the tongues 127 and are suitably scored, as indicated by the score lines 132, so that the portions 133 beyond the score lines may be bent downwardly as shown in Fig. 25. Suitable edge-forming strips 134, similar to the strips 121 shown in Fig. 23, are provided for securement to the upper ends of the tongues 127 and the inwardly turned ends of these strips 134 extend under the downwardly turned portions 133 of the end walls 130. As shown, the longitudinal marginal portions 129 are so formed as to extend beyond the fold lines 131 which correspond to the ends of the bottom wall of the container, and these extending portions are bent inwardly into engagement with and are preferably adhesively secured to the outer surfaces of the end walls 130, as shown in Fig. 25.

Figure 26:
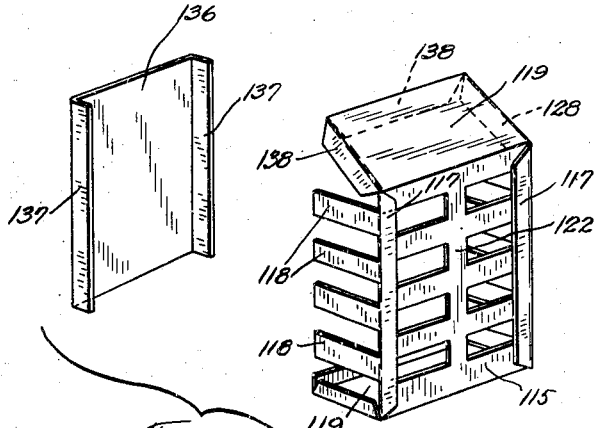
Fig. 26 is an exploded perspective view of still another form of carton before completion.
Figure 27:
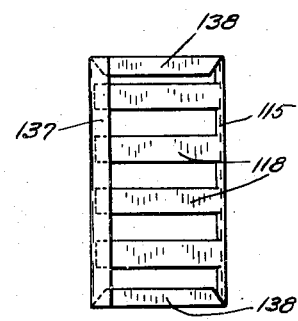
Fig. 27 is a side elevational view of the carton shown in Fig. 26.

In Figs. 26 and 27 the invention is shown as embodied in a carton of the type having openable and closable end flaps. The various parts of this carton which are similar to the corresponding parts of the carton shown in Figs. 20 to 23 have been given similar reference numerals. Thus it will be observed that the carton consists of side members or tongues 118 which are formed from the material of another wall 115, in this case a side wall but in the embodiment of Fig. 20 the bottom wall, this wall 115 having a longitudinally extending central strip 122 and the marginal portions 117 being inturned into face-to-face engagement with the outer surfaces of the wall 115 intermediate the apertures left by the tongues 118. In place of the edge-forming strips 121 shown in Fig. 23, the carton is provided with a solid wall-forming portion 136 which is provided along opposed edges thereof with edge-forming strips 137 adapted to be adhesively secured to the free ends of the tongues 118. The end wall portions 119 in this embodiment of the invention are provided with tuck flaps 138, as shown, which, when the ends of the carton are closed, extend within the side walls formed by the portion 136 and the side members or tongues 118, and these ends of the carton may be opened or closed at will to fill the carton or remove the contents thereof. If desired, one of the end walls may be adhesively secured in its closed position so that the carton may be opened from one end only without destroying the carton.

It will now be apparent that the invention may be embodied in various types of cartons, containers, trays, dishes and the like, and that attractive and rugged articles are produced with a minimum number of manipulative steps and with the employment of a minimum amount of material relative to the size of the finished article. Various types of foldable or formable material may likewise be employed depending upon the use to which the finished article is to be put, and various types of finishes, such as plating or enameling, may be employed.

Claims directed broadly to the process for manufacturing the containers disclosed herein have been divided from this case and are being asserted in my copending application Serial No. 96,719, filed June 2, 1949, and article and method claims generic to and specific to those species disclosed in Figs. 20 through 27 herein have been divided from this case and are being asserted in my copending application Serial No. 96,720, filed June 2, 1949. The design aspects of those species disclosed in Figs. 11, 13 and 8 herein are claimed, respectively, in the copending design applications of Paul F. Simpson, Serial Nos. D–141,091, D– 141,092 and D–141,093, filed August 28, 1947, all assigned to the assignee of this application.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A container formed from sheet material comprising end walls, side walls, a bottom wall having a plurality of apertures therein, each of said apertures extending to an outer edge of said bottom wall adjacent each of said side walls, a plurality of side members constituting each of two of said side walls and extending upwardly from the plane of said bottom wall at the outer ends of said apertures, means connecting the lower ends of said side members to the portions of said bottom wall intermediate said apertures, and means connecting the upper ends of said side members to form the upper edge of a side wall of said container.

2. A container formed from sheet material comprising end walls, side walls, a bottom wall having a plurality of apertures therein, each of said apertures extending to an outer edge of said bottom wall adjacent each of said side walls, a plurality of side members constituting each of two of said side walls and extending upwardly from the plane of said bottom wall at the outer ends of said apertures, strip means extending along said outer edge integrally connecting the lower ends of said side members to the portions of said bottom wall intermediate said apertures, and strip means connecting the upper ends of said side members to form the upper edge of a side wall of said container.

3. A container formed from sheet material comprising end walls, side walls, a bottom wall having a row of apertures therein along each of two longitudinal edges, the apertures in each row extending to the adjacent edge, spaced apart side wall members extending upwardly from the plane of said bottom wall at the outer ends of said apertures to form said side walls, means along each of said longitudinal edges for connecting the lower ends of said side wall members to the edge portions of said bottom wall intermediate said apertures, end wall members extending upwardly from other edges of said bottom wall to form said end walls, and means connecting the upper ends of all of said side and end wall members to form a continuous upper edge on said container.

4. A container formed from sheet material comprising end walls, side walls, a bottom wall having a row of apertures therein along each of two longitudinal edges, the apertures in each row extending to the adjacent edge, spaced apart side wall members extending upwardly from the plane of said bottom wall at the outer ends of said apertures to form said side walls, strip means extending along said longitudinal edges integrally connecting the lower ends of said side wall members to the edge portions of said bottom wall intermediate said apertures, end wall members extending upwardly from other edges of said bottom wall to form said end walls, and strip means connecting the upper ends of all of said side and end wall members to form a continuous upper edge on said container.

5. A container formed from sheet material comprising a bottom wall having a row of apertures therein along each of two longitudinal edges, the apertures in each row extending to the adjacent edge, spaced apart side wall members extending upwardly from the plane of said bottom wall at the outer ends of said apertures, a continuous strip along each of said edges disposed substantially in the plane of said side wall members integrally connecting the lower ends of said side wall members to the edge portions of said bottom wall intermediate said apertures, said strips extending downwardly from the plane of said bottom wall, side wall members extending upwardly from other edges of said bottom wall, and a frame secured to the upper ends of all of said side wall members to form a continuous upper edge on said container.

6. An open topped container formed from sheet metal comprising a bottom wall having a row of apertures therein along each of two longitudinal edges, the apertures in each row extending to the adjacent edge, spaced apart side wall members extending upwardly from the plane of said bottom wall at the outer ends of some of said apertures, a continuous strip along each of said edges extending downwardly from the plane of said bottom wall and integral with said side wall members and the portions of said bottom wall intermediate said apertures, side wall members extending upwardly from other edges of said bottom wall, flanges extending outwardly from the upper ends of all of said side wall members, and a wire frame welded to said flanges to form a continuous upper edge on said container.

7. A sheet metal container comprising a bottom wall having a plurality of apertures therein each of which extends to an outer edge thereof, U-shaped side members extending upwardly from the plane of said bottom wall at the outer ends of some of said apertures, the yoke portion of each U-shaped side member extending angularly from the upper ends of the legs of the U to form a flange, strip means supported on and welded to said flanges to form a continuous upper edge on said container, and strip means along an edge of said bottom wall extending downwardly from the plane thereof integrally connecting the lower ends of the legs of said U-shaped side members to edge portions of said bottom wall intermediate said apertures thereby to support said side members and form a continuous runner along a lower edge of said container.

8. A sheet metal soap dish comprising a bottom wall having a row of apertures therein along each of two edges, the apertures in each row terminating short of the longitudinal center line of said bottom wall to provide a continuous center strip and extending to said outer edges, side members extending upwardly from the plane of said bottom wall at the outer ends of some of said apertures, a strip along each of said edges extending downwardly from the plane of said bottom wall integrally connecting the lower ends of said side members to edge portions of said bottom wall intermediate said apertures, side members extending upwardly from said bottom wall at other edges thereof, and a wire frame welded to the upper ends of all of said side members to form a continuous upper edge on said soap dish.

9. A tumbler and toothbrush holder comprising a bottom wall for the tumbler-holding portion having apertures therein extending to opposed edges thereof, side members extending upwardly from the plane of said bottom wall at the outer ends of said apertures, a strip along each of said edges extending downwardly from the plane of said bottom wall integrally connecting the lower ends of said side members to the edges of portions of said bottom wall, side members extending upwardly from other edges of said bottom wall, brush-holding loops extending outwardly from said last mentioned side members, and a frame secured to the upper ends of all of said side members to form a continuous upper edge about said tumbler-holding portion.

10. A tumbler and toothbrush holder comprising a bottom wall for the tumbler-holding portion having apertures therein extending to opposed edges thereof, side members extending upwardly from the plane of said bottom wall at the outer ends of said apertures, a strip along each of said edges extending downwardly from the plane of said bottom wall integrally connecting the lower ends of said side members to the edges of portions of said bottom wall, side members extending upwardly from other edges of said bottom wall, brush-holding loops extending outwardly from said last mentioned side members intermediate the ends thereof, the portions of said last mentioned side members extending above said loops being formed from material taken from said loops to form the brush-receiving openings therein, and a frame secured to the upper ends of all of said side members to form a continuous upper edge about said tumbler-holding portion.

11. A container comprising a bottom wall having a plurality of apertures extending entirely thereacross from edge to edge, a plurality of side members extending upwardly from the plane of said bottom wall at the opposite outer ends of each of said apertures to form side walls, strip means connecting the lower ends of said side members to the edges of the portions of said bottom wall adjacent said apertures, and means connecting the upper ends of said side members to form the upper edges of said side walls.

12. A tumbler and toothbrush holder comprising a bottom wall for the tumbler-holding portion having apertures therein extending thereacross from edge to edge, side members extending upwardly from the plane of said bottom wall at the outer ends of said apertures, a strip along each of said edges extending downwardly from the plane of said bottom wall integrally connecting the lower ends of said side members to the edges of the portions of said bottom wall adjacent said apertures, other side members extending upwardly from other edges of said bottom wall, brush-holding loops extending outwardly from said other side members, and a frame secured to the upper ends of all of said side members to form a continuous upper edge about said tumbler-holding portion.

13. A combined tumbler and toothbrush holder comprising a bottom wall for the tumbler holder portion, brush-holder portions integral with said bottom wall and extending outwardly in coplanar relation on opposite sides of said bottom wall, said bottom wall having diagonally disposed apertures therein extending to the corners thereof, side members extending upwardly from the plane of said bottom wall at said corners, means connecting the lower ends of said side members to the portions of said bottom wall intermediate said apertures, and a frame welded to the upper ends of said side members to form a continuous upper edge on said tumbler holder portion.

14. A container formed from sheet material comprising end walls, side walls, a bottom wall having a plurality of apertures therein terminating adjacent said side walls, each of said side walls being formed by a plurality of upwardly extending members bent from sheet material of said apertures, means integral with said bottom wall integrally connecting the lower ends of said members, and strip means connecting the upper ends of said members to form the upper edge of a side wall of said container.

15. A container formed from sheet material comprising a bottom wall, a plurality of peripherally spaced tab members struck up from a central area of said bottom wall to form each of a pair of side walls for said container and to form a plurality of apertures in said bottom wall terminating adjacent each of said side walls, means integral with said bottom wall and the lower ends of said tab members for integrally connecting the lower ends of said tab members, and strip means connecting the upper ends of said members to form the upper edge of a side wall of said container.

16. A container formed from sheet metal comprising a bottom wall having a plurality of apertures therein, each of said apertures extending to an outer edge of said bottom wall, side members extending upwardly from the plane of said bottom wall at the outer ends of said apertures, means connecting the lower ends of said side members to the portions of said bottom wall intermediate said apertures, ring-engaging flanges bent out of the plane of said side members adjacent the upper ends thereof, and a frame member secured to said flanges connecting the upper ends of said side members to form the upper edge of a side wall of said container.

17. A tumbler holder comprising a bottom wall, said bottom wall having a plurality of radially extending apertures therein extending toward an outer peripheral edge thereof, side members extending upwardly from the outer ends of said apertures constituting the upwardly extending wall of said holder, means connecting the lower ends of said side members to the portions of said bottom wall intermediate said apertures, and a frame member secured to the upper ends of said side members to form a continuous upper edge for said tumbler holder.

18. A tumbler holder comprising a bottom wall, a depending flange from the outer peripheral edge of said bottom wall, said bottom wall having a plurality of radially extending apertures therein extending toward said outer peripheral edge, side members extending upwardly from the outer ends of said apertures constituting the upwardly extending wall if said holder, means including a portion of said bottom wall and said flange connecting the lower ends of said side members to the portions of said bottom wall intermediate said apertures, and a frame member secured to the upper ends of said side members to form a continuous upper edge for said tumbler holder.

19. A tumbler holder comprising a bottom wall of sheet material, a plurality of radially spaced tab members struck up from a central area of said bottom wall to form in combination an upwardly extending wall for said holder and to form a plurality of radially spaced apertures in said bottom wall having their outer ends terminating adjacent the lower ends of said tab members, means integral with said bottom wall and the lower ends of said tab members for integrally connecting the lower ends of said tab members and a frame member secured to the upper ends of said tab members to form an upper edge for said tumbler holder.

20. A combined tumbler and toothbrush holder comprising a bottom wall for the tumbler holder portion, brush holder portions integral with said bottom wall and extending outwardly therefrom in substantially co-planar relationship, a plurality of radially spaced tab members struck up from a central area of said bottom wall to form in combination an upwardly extending wall for said tumbler holder portion and to form a plurality of radially spaced apertures in said bottom wall having their outer ends terminating adjacent the lower ends of said tab members, means integral with said bottom wall including a depending peripheral flange connecting the lower ends of said tab members, and a frame member secured to the upper ends of said tab members to form an upper edge for said tumbler holder portion.

21. A container formed from sheet material comprising a bottom wall, a plurality of spaced tab members struck up from a central area of said bottom wall to form each of a pair of side walls for said container and to form a plurality of apertures in said bottom wall terminating adjacent each of said side walls, means integral with said bottom wall and the lower ends of said tab members for integrally connecting the lower ends of said tab member and including an integral portion deformed out of the plane of said bottom wall to provide a reinforcement for said container, and strip means connecting the upper ends of said members to form the upper edge of a side wall of said container.

22. A container formed from sheet material comprising a bottom wall, a side wall including a plurality of spaced tab members struck upwardly from one surface of said bottom wall leaving apertures therein, a frame member connecting the upper ends of said tab members to form the upper edge of said side wall, and means also formed from said sheet material integral with said bottom wall and said tab members connecting the lower ends of said tab members, said last mentioned means including portions extending from the other surface of said bottom wall to provide a reinforcement for said container.

ROY S. SANFORD.

REFERENCES CITED

The following references are of record in the file of this patent:

UNITED STATES PATENTS

| Number | Name | Date |
| --- | --- | --- |
| D. 121,399 | Sanford | July 9, 1940 |
| 112,983 | Thatcher | Mar. 21, 1871 |
| 1,118,738 | Carroll | Nov. 24, 1914 |
| 1,242,956 | Lewyt | Oct. 16, 1917 |
| 1,268,595 | Manley | June 4, 1918 |
| 1,863,471 | Colaizzi | June 14, 1932 |
| 1,910,888 | Fitzgerald | May 23, 1933 |
| 1,925,691 | Gillespie | Sept. 5, 1933 |
| 1,977,113 | Baresch | Oct. 16, 1934 |
| 2,126,583 | Shaff | Aug. 9, 1938 |
| 2,315,368 | Fairchild | Mar. 30, 1943 |
| 2,346,206 | Broderick | Apr. 11, 1944 |
| 2,354,098 | Bomber | July 18, 1944 |
| 2,414,379 | Kulling | Jan. 14, 1947 |

FOREIGN PATENTS

| Number | Country | Date |
| --- | --- | --- |
| 312,069 | Italy | Oct. 19, 1933 |